United States Patent
Groos et al.

(10) Patent No.: US 10,781,296 B2
(45) Date of Patent: Sep. 22, 2020

(54) POLYMER COMPOSITION HAVING DELAYED CRYSTALLIZATION BEHAVIOR, ADDITIVE COMPOSITION THAT INFLUENCES THE CRYSTALLIZATION BEHAVIOR, METHOD FOR LOWERING THE CRYSTALLIZATION POINT, AND USE OF AN ADDITIVE COMPOSITION

(71) Applicant: FRAUNHOFER-GESELLSCHAFT ZUR FÖRDERUNG DER ANGEWANDTEN FORSCHUNG E.V., Munich (DE)

(72) Inventors: Benjamin Groos, Hamburg (DE); Rudolf Pfaendner, Rimbach (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 93 days.

(21) Appl. No.: 15/738,515

(22) PCT Filed: Jun. 13, 2016

(86) PCT No.: PCT/EP2016/063428
§ 371 (c)(1),
(2) Date: Dec. 20, 2017

(87) PCT Pub. No.: WO2016/207003
PCT Pub. Date: Dec. 29, 2016

(65) Prior Publication Data
US 2018/0186970 A1    Jul. 5, 2018

(30) Foreign Application Priority Data
Jun. 23, 2015   (DE) ........................ 10 2015 211 632

(51) Int. Cl.
| | | |
|---|---|---|
| *C08K 5/3445* | (2006.01) | |
| *C08K 5/19* | (2006.01) | |
| *C08K 5/22* | (2006.01) | |
| *C08K 5/3415* | (2006.01) | |
| *C08K 5/3465* | (2006.01) | |
| *C08L 79/08* | (2006.01) | |
| *C08L 77/06* | (2006.01) | |
| *C08L 77/02* | (2006.01) | |

(52) U.S. Cl.
CPC .............. *C08K 5/3445* (2013.01); *C08K 5/19* (2013.01); *C08K 5/22* (2013.01); *C08K 5/3415* (2013.01); *C08K 5/3465* (2013.01); *C08L 77/02* (2013.01); *C08L 77/06* (2013.01); *C08L 79/08* (2013.01)

(58) Field of Classification Search
None
See application file for complete search history.

(56) References Cited

U.S. PATENT DOCUMENTS

| | | | |
|---|---|---|---|
| 4,496,718 A | 1/1985 | Rudy | |
| 4,761,181 A * | 8/1988 | Suzuki | C07F 3/00 106/31.37 |
| 5,281,709 A * | 1/1994 | Akiyama | C09B 67/0096 544/347 |
| 6,399,681 B1 * | 6/2002 | Tsuruhara | C08K 5/0041 524/127 |
| 7,601,771 B2 | 10/2009 | Schmidt et al. | |
| 8,097,668 B2 * | 1/2012 | Hein | C08K 5/0041 106/287.21 |
| 10,138,354 B2 * | 11/2018 | Groos | C08K 3/16 |
| 2005/0234159 A1 | 10/2005 | Takeuchi et al. | |
| 2006/0100323 A1 | 5/2006 | Schmidt et al. | |
| 2006/0173108 A1 | 8/2006 | Xu | |
| 2008/0114105 A1 | 5/2008 | Hell et al. | |
| 2011/0039467 A1 | 2/2011 | Xu | |
| 2014/0128519 A1 | 5/2014 | Chen et al. | |
| 2016/0052927 A1 | 2/2016 | Pfaendner et al. | |
| 2016/0130448 A1 | 5/2016 | Eichfelder et al. | |
| 2016/0272789 A1 | 9/2016 | Pfaendner et al. | |
| 2017/0107375 A1 | 4/2017 | Pfaendner et al. | |
| 2017/0121499 A1 | 5/2017 | Pfaendner et al. | |
| 2017/0260362 A1 | 9/2017 | Pfaendner et al. | |
| 2017/0260363 A1 | 9/2017 | Pfaendner et al. | |
| 2017/0260366 A1 | 9/2017 | Groos et al. | |

(Continued)

FOREIGN PATENT DOCUMENTS

| | | |
|---|---|---|
| CN | 1681878 A | 10/2005 |
| CN | 101580966 A | 11/2009 |
| CN | 103694692 A | 4/2014 |

(Continued)

OTHER PUBLICATIONS https://www.interchim.fr/cat/IonicLiquids.pdf (Year: 2020).*
U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,471, filed Mar. 15, 2017.
U.S. Appl. No. 15/511,445, filed Mar. 15, 2017.
U.S. Appl. No. 15/529,026, filed May 23, 2017.

(Continued)

*Primary Examiner* — Peter A Salamon
(74) *Attorney, Agent, or Firm* — Leydig, Voit & Mayer, Ltd.

(57) ABSTRACT

The present invention relates to a polymer composition, which contains or consists of a matrix of at least one thermoplastic polymer capable of crystallization and, incorporated therein, at least one azine dye and at least one ion liquid. Said polymer composition is characterized in that the crystallization point relative to non-additivated polymer compositions is substantially reduced. The invention further relates to a corresponding additive composition for the crystallization and/or for the lowering of the crystallization point of thermoplastic polymers or polymer compositions capable of crystallization.

18 Claims, No Drawings

(56) References Cited

U.S. PATENT DOCUMENTS

| | | | |
|---|---|---|---|
| 2017/0267835 A1 | 9/2017 | Groos et al. | |
| 2018/0186970 A1* | 7/2018 | Groos | C08K 5/19 |

FOREIGN PATENT DOCUMENTS

| | | | |
|---|---|---|---|
| CN | 103709732 A | | 4/2014 |
| CN | 104073900 A | | 10/2014 |
| DE | 2 012 105 A1 | | 11/1970 |
| DE | 2 229 803 A1 | | 1/1973 |
| DE | 102 43 181 A1 | | 1/2004 |
| DE | 10 2006 031952 A1 | | 1/2008 |
| DE | 10 2006 045869 A1 | | 4/2008 |
| DE | 10 2009 000784 A1 | | 8/2010 |
| GB | 1309944 A | | 3/1973 |
| GB | 1 402 021 A | | 8/1975 |
| JP | S48-28541 A | | 4/1973 |
| JP | 2001-207063 A | | 7/2001 |
| JP | 2001207063 A | * | 7/2001 |
| JP | 2003-313724 A | | 11/2003 |
| JP | 2005-532440 A | | 10/2005 |
| JP | 2010-202714 A | | 9/2010 |
| JP | 2010-209219 A | | 9/2010 |
| JP | 2013-253225 A | | 12/2013 |
| JP | 2014-177560 A | | 9/2014 |
| WO | WO 00/26302 A | | 5/2000 |
| WO | WO 2004/005391 A1 | | 1/2004 |
| WO | WO 2006/107759 A2 | | 10/2006 |
| WO | WO 2011/069960 A1 | | 6/2011 |
| WO | WO 2012/021146 A1 | | 2/2012 |
| WO | WO 2012/084776 A1 | | 6/2012 |
| WO | WO 2012/084777 A1 | | 6/2012 |
| WO | WO 2014/120488 A1 | | 8/2014 |
| WO | WO 2014/198539 A1 | | 12/2014 |

OTHER PUBLICATIONS

Lubs, *The Chemistry of Synthetic Dyes and Pigments*, Reinohold Publishing Corporation, pp. 235, 241, 242, 266 (1955).

Japan Patent Office, 3$^{rd}$ Party Submission of Publication in Japanese Patent Application No. 2017-566693 (mailed Feb. 26, 2019).

Berneth, H., "Azine Dyes," *Ullmann's Encyclopedia of Industrial Chemistry*, (2005)—Table of contents only.

Chaurasia et al., "Dielectric relaxation and conductivity studies on (PEO:LiClO$_4$) polymer electrolyte with added ionic liquid [BMIM][PF$_6$]: Evidence of ion—ion interaction," *J. Polym. Sci. B: Polym. Phys.* 49(4): 291-300 (2011).

Chaurasia et al., "Effect of ionic liquid on the crystallization kinetics behaviour of polymer poly(ethylene oxide)," *CrystEngComm* 15; 6022-6034 (2013)—Abstract only.

Chaurasia et al., "Ion—polymer and ion—ion interaction in PEO-based polymer electrolytes having complexing salt LiClO$_4$ and/or ionic liquid, [BMIM][PF$_6$]," *J. Raman Spectrosc.*, 42(12): 2168-2172 (2011)—Abstract only.

Chaurasia et al., "Role of ionic liquid [BMIMPF$_6$] in modifying the crystallization kinetics behavior of the polymer electrolyte PEO-LiClO$_4$," *RSC Adv.* 5: 8263-8277 (2015).

Chaurasia et al., "Structural and transport studies on polymeric membranes of PEO containing ionic liquid, EMIM-TY: Evidence of complexation," *Solid State Ionics* 183(1): 32-39 (2011)—Abstract only.

Dou et al., "Crystallization behavior of poly(ethylene terephthalate)/pyrrolidinium ionic liquid," *Polym. Int.* 62(12): 1698-1710 (2013)—Abstract only.

Karmakar et al., "Structure and ionic conductivity of ionic liquid embedded PEO-LiCF$_3$SO$_3$ polymer electrolyte," *AIP Advances* 4(8): 087112 (2014).

Kurja et al., "Nucleating Agents for Semicrystalline Polymers " *Plastic Additives Handbook*, 6$^{th}$ Edition, H. Zweifel et al. Editors (Munich, Germany), pp. 967-990 (2009)—Abstract only.

Mercier, J.P., "Nucleation in polymer crystallization: A physical ora chemical mechanism?," *Polym. Eng. Sci* 30(5): 270-278 (1990)—Abstract only.

Sukata et al., "Influence of the Nigrosine Dye on the Thermal Behavior of Polyamide 66," *J. Appl. Polym. Sci.* 101: 3270-3274 (2006).

Wellen et al., "Antinucleating action of polystyrene on the isothermal cold crystallization of poly(ethylene terephthalate)," *J. Appl. Polym. Sci.* 114(3): 1184-1895 (2009)—Abstract only.

Wellen et al., "Effect of styrene-co-acrylonitrile on cold crystallization and mechanical properties of poly(ethylene terephthalate)," *J. Appl. Polym. Sci* 125(4): 2701-2710 (2012).

Wellen et al., "Non-isothermal cold crystallization kinetics and morphology of PET + SAN blends," *J. Appl. Polym. Sci* 116(2): 1077-1087 (2010)—Abstract only.

Xu et al., "Investigation on the Interaction between Polyamide and Lithium Salts," *J. Appl. Polym Sci* 77: 2685-2690 (2000).

Yousfi et al., "Ionic liquids: A new way for the compatibilization of thermoplastic blends," *Chem. Eng. J.* 255: 513-524 (2014)—Abstract only.

European Patent Office, International Search Report in International Application No. PCT/EP2016/063428 (dated Sep. 29, 2016).

European Patent Office, Written Opinion in International Application No. PCT/EP2016/063428 (dated Sep. 29, 2016).

International Bureau of WIPO, International Preliminary Report on Patentability in International Application No. PCT/EP2016/063428 (dated Dec. 26, 2017).

Chinese National Intellectual Property Administration, First Office Action and Search Report in Chinese Patent Application No. 201680037358.9 (dated Oct. 10, 2019).

Japan Patent Office, Notice of Reasons for Refusal and Search Report in Japanese Patent Application No. 2017-566693 (dated Nov. 1, 2019).

Korean Intellectual Property Office, Notification of Reasons for Refusal in Korean Patent Application No. 10-2018-7001963 (May 16, 2020).

Green Complex Catalysis, Jun Zhang, Editor, Gansu Culture Press, China (2009), pp. 47-19.

China National Intellectual Property Administration, Second Office Action and supplemental search report in Chinese Patent Application No. 201680037358.9 (dated Jul. 6, 2020).

Japan Patent Office, Decision of Refusal in Japanese Patent Application No. 2017-566693 (dated Jul. 6, 2020).

* cited by examiner

POLYMER COMPOSITION HAVING DELAYED CRYSTALLIZATION BEHAVIOR, ADDITIVE COMPOSITION THAT INFLUENCES THE CRYSTALLIZATION BEHAVIOR, METHOD FOR LOWERING THE CRYSTALLIZATION POINT, AND USE OF AN ADDITIVE COMPOSITION

CROSS-REFERENCE TO RELATED APPLICATIONS

This patent application is the U.S. national phase of International Application No. PCT/EP2016/063428, filed on Jun. 13, 2016, which claims the benefit of German Patent Application No. 10 2015 211 632.8, filed Jun. 23, 2015, the disclosures of which are incorporated herein by reference in their entireties for all purposes.

The present invention relates to a polymer composition which comprises a matrix made of at least one crystallisable, thermoplastic polymer, and also, incorporated herein, at least one azine dye and at least one ionic liquid or consists hereof. This polymer composition is distinguished by the crystallisation point thereof, relative to non-additivated polymer compositions, being significantly reduced. In addition, the present invention relates to a corresponding additive composition for crystallisation and/or for lowering the crystallisation point of crystallisable, thermoplastic polymers or polymer compositions.

In addition, the invention relates to a method for influencing the crystallisation behaviour of crystallisable, thermoplastic polymers or polymer compositions, in the case of which one azine dye and also one ionic liquid is incorporated in a thermoplastic, crystallisable matrix polymer or a polymer composition. In addition, purposes of use of the previously mentioned additive composition, consisting of one azine dye and one ionic liquid, are indicated.

Thermoplastic plastic materials are present either in amorphous or (partially) crystalline form. In amorphous plastic materials, the polymer chains are disordered. Amorphous polymers, such as e.g. polystyrene, PVC or polycarbonate, are frequently transparent, glossy, mechanically brittle and often have low chemical resistance. During processing in the melting process, the flowability is comparatively rather low, however e.g. the shrinkage of a moulded part produced with these amorphous plastic materials is low, i.e. advantageous. In the case of (partially) crystalline plastic materials, the polymer chains are positioned in an orderly fashion one against the other in so-called lamellae. (Partially) crystalline polymers, such as polypropylene, polyester or polyamide, are generally opaque with a tough, hard mechanical behaviour and good chemical resistance. The flowability during melt processing is frequently high but the shrinkage in the moulded part is pronounced. Partially crystalline polymers have, in addition to crystalline regions, also an amorphous phase. The properties of partially crystalline polymers are then determined, inter alia, by the proportion of crystallites relative to the amorphous proportions, the so-called crystallisation degree, the shape of the crystallites (so-called spherulites), the size, the number and the distribution of the crystallites in the amorphous matrix.

In order to adapt specific properties of plastic materials specifically during processing and in application, the crystallisation behaviour of plastic materials can then, inter alia, be influenced by the processing conditions but also by corresponding additives. For example, frequently so-called nucleation agents (or nuclei formers) are added to the plastic material. These additives can then reduce the cycle times in the production process, increase the transparency of the plastic material, improve the mechanical properties and the thermostability (see e.g. J. Kurja, N. A. Mehl, Nucleating agents for semicrystalline polymers in Plastic Additives Handbook, 6th Edition, H. Zweifel, R. D. Maier, M. Schiller (Editor), Munich 2009, page 967-990). As nucleation agents, a large number of chemical substance classes is used, such as e.g. sorbitol derivatives, metal phosphates or aryl amides in polypropylene, alkali metal salts, such as e.g. sodium benzoate in polyethylene terephthalate (PET) and talc or alkaline earth salts of adipic acid in the case of polyamides. Physical and chemical processes of the nucleation of polymers are described e.g. in J. P. Mercier, Pol. Eng. Sci. 1990, 30, 270-278.

On the other hand, it can be desired also for specific applications or for achieving specific plastic material properties to prevent or to delay the crystallisation of partially crystalline polymers. However, there are only very few additives for this purpose which can effect this. In the case of polyesters, for example the crystallisation is restricted by the addition of SAN or polystyrene (R. M. R. Wellen, M. S. Rabello, J. Appl. Pol. Sci. 2009, 114, 1884-1895, R. M. R. Wellen, M. S. Rabello, J. Appl. Pol. Sci. 2010, 116, 1077-1087, R. M. R. Wellen, E. L. Canedo, M. S. Rabello, J. Appl. Pol. Sci. 2012, 125, 2701-2710), in the case of polyamides, aromatic compounds (US 2005/02344159) inter alia are proposed for this purpose.

For the production of (partially) crystalline polymers, in particular polyamides with delayed crystallisation or a lowered crystallisation point, various substance classes were examined, such as e.g. polycyclic aromatics (US 2005/0234159), amongst these above all dyes, such as nigrosine (K. Sukata et al. J. Appl. Pol. Sci. 2006, 101, 3270-3274) or various metal salts (DE 2012105, DE 2229803), such as e.g. lithium salts (Y. Z. Xu et al. J. Appl. Pol. Sci. 2000, 77, 2685-2690). The previously described additives do not however fulfil all the requirements, in particular there is a requirement, with as low as possible quantities of additive, to achieve a significant lowering of the crystallisation temperature or a delay in the crystallisation. Small additive quantities are advantageous since, as a result, other polymer properties are influenced less and furthermore cost advantages are associated therewith.

Previously, ionic liquids have been used in polymers for various purposes, e.g. JP 20100202714, JP 2003313724, JP 2013253225, JP 2010209219 and WO 2011/069960 describe antistatic polymer compositions which, e.g. in order to improve the antistatic effect of ionic block copolymers, can comprise inter alia ionic liquids or metal salts. WO 2014/198539 describes similarly the use of polyamides or polyurethanes together with ionic liquids as conductive fillers for coatings.

WO 2004/005391 and CN 101580966 describe a polymer composition, ionic liquids being used as plasticiser. In WO 2004/005391, only a very small lowering of the melting temperature of a polyamide copolymer is however effected due to the ionic liquid at 15% addition.

CN 104073900 and also WO 2004/005391 claim the addition of ionic liquids to polyamides with a biocide effect.

WO 2014/120488, WO 2012/021146, US 2011/0039467 describe the use of ionic liquids as flame retardant in plastic materials.

US 2014/0128519, WO 2012/084777 and WO 2012/084776 claim nanocomposites with carbon nanotubes or based on other additives such as carbon black, and ionic liquids for improved producibility or conductivity.

US 2006/0173108 describes the combination of sorbitol nucleation agents inter alia with ionic liquids in order to improve the nucleation effect, i.e. in order to increase the crystallisation temperature of polypropylene.

WO 2006/107759 describes urethane acrylates with an anti-nucleation agent for stereolithography. By way of example, 1,3-dichloro-2-propanol phosphate is mentioned as anti-nucleation agent. The object of the anti-nucleation agent thereby lies in preventing the crystallisation in the uncured resin, the applications do not concern thermoplastic products.

J. Dou and Z. Liu describe, in Pol. Intern. 62, 2013, 1698-1710, that the addition of ionic liquids as matrix for the polycondensation of polyesters leads to crystallisation acceleration.

S. K. Chaurasia et al. describe in Cryst. Eng. Comm. 2013, 15, 6022-6034, J. Polym. Sci. B: Polym. Phys. 2011, 49, 291-300, RSC Adv., 2015, 5, 8263-8277 and J. Raman Spectrosc. 2011, 42, 2168-2172, the slowing of the crystallisation kinetics of polyethylene oxide (PEO) and of the corresponding electrolyte with lithium perchlorate by the addition of 1-butyl-3-methylimidazolium hexafluorophosphate and in Solid State Ionics 183 (2011) 32-39, a reduction in the crystallinity of a polyethylene oxide (PEO) by the addition of 1-ethyl-3-methylimidazolium tosylate (EMIM-TY). Comparable results are presented by A. Karmakar and A. Ghosh in AIP Advances 2014, 4, 087112 with the addition of 1-ethyl-3-methylimidazolium trifluoromethane sulphonate to a polyethylene oxide-$LiCF_3SO_3$ electrolyte.

M. Yousfi et al. describe, in Chem. Eng. J. 255 (2014) 513-524, a reduction in the crystallisation temperature and crystallisation kinetics of the polypropylenes (PP) and polyamide 6 (PA6) phase in an 80/20 blend of the two polymers by compounding with trihexyltetradecylphosphonium-bis-(trifluoromethylsulphonyl)imide and trihexyltetradecyl-phosphonium-bis 2,4,4-(trimethylpentyl)phosphinate.

It is therefore the object of the present invention to make available improved additives for crystallisation delay or for lowering the crystallisation point of (partially) crystalline polymers, in particular of polyamides and plastic material compositions resulting therefrom.

This object is achieved, with respect to a polymer having the disclosed features. In addition, an additive composition for crystallisation delay and/or for lowering the crystallisation point of crystallisable, thermoplastic polymers or polymer compositions is indicated. The present invention also relates to a method for crystallisation delay and/or for lowering the crystallisation point of a crystallisable, thermoplastic polymer. The purposes of use of this additive composition are also disclosed.

The invention hence relates to a polymer composition, comprising or consisting of
 a) a matrix made of at least one crystallisable, thermoplastic polymer,
 b) at least one azine dye, and
 c) at least one ionic liquid.

Crystallisable, thermoplastic polymers thereby have a crystallite melting point which can be detected for example by differential scanning calorimetry (DSC) or by differential mechanical analysis (DMA).

The azine dyes listed under feature b) are standard commercial products and described for example in H. Bernetz, Azine Dyes, Ullmann's Encyclopedia of Industrial Chemistry (DOI 10.1002/14356007.a03_213.pub3). Preferred azine dyes are indulines and nigrosines, nigrosines are very particularly preferred. For the purposes of the present invention with respect to the azine dyes used according to the invention, reference is made to the definition in the previously mentioned literature site.

In addition, the composition according to the invention can comprise metal salts. These can thereby concern inorganic or organic salts. Preferred mono-, bi-, tri- or tetravalent metal salts are in particular alkali- and alkaline earth salts, and also zinc salts, alkali- and alkaline earth halogenides are very particularly preferred, such as e.g. lithium chloride, lithium bromide, magnesium chloride and calcium chloride. These salts are commercially available.

Surprisingly, it could be established that the combination of an azine dye with an ionic liquid leads to a noticeable lowering of the crystallisation point or to crystallisation delay in the case of crystallisable polymers. It was hereby surprising in particular that the combination of selected dyes, such as e.g. nigrosine with ionic liquids, leads to a synergistic influence on the crystallisation of crystallisable thermoplastics, in particular in the case of polyamides.

In none of the above-mentioned literature sites is a synergistic composition according to the present invention reported. Since in addition several literature sites show the opposite effect of ionic liquids, i.e. a crystallisation acceleration, the synergism found here should be regarded as particularly surprising.

Hence new combinations for lowering the crystallisation temperature of (partially) crystalline polymers, which achieve a high effect relative to current products in comparatively low usage concentrations, are proposed. Due to the low usage concentrations, other polymer properties are not or less negatively influenced than in the conventional case. The compositions used are cheaply available on a large industrial scale.

According to a preferred embodiment, the at least one azine dye is selected from the group consisting of phenazine dyes, oxazine dyes, thiazine dyes and/or bisazine dyes.

In particular, nigrosines and/or indulines can be used as azine dye, nigrosines being particularly preferred.

Preferably, the at least one ionic liquid is thereby selected from the group c) consisting of compounds made of an organic cation and an organic or inorganic anion with a melting point at normal pressure of less than 150° C.

Preferably the organic cation is selected from the group consisting of methyltri(1-butyl) ammonium, 2-hydroxyethylammonium, 1-methylimidazolium, 1-ethylimidazolium, 1-(1-butyl) imidazolium, 1-(1-octyl)-imidazolium, 1-(1-dodecyl)imidazolium, 1-(1-tetradecyl)imidazolium, 1-(1-hexadecyl) imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 1,4-dimethyl-3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium, ethyltributylphosphonium, tetrabutylphosphonium, tetraoctylphosphonium, tributylmethylphosphonium, tributyltetradecylphosphonium, trihexyltetradecylphosphonium, 1-butyl-1-methylpiperidinium or 1-methyl-1-propylpiperidinium.

The organic or inorganic anion is preferably selected from the group consisting of chloride, bromide, hydrogen sulphate, tetrachloroaluminate, thiocyanate, methylsulphate, ethylsulphate, methane sulphonate, formiate, acetate, dimethylphosphate, diethylphosphate, p-toluene sulphonate, tetrafluoroborate, hexafluorophosphate, bis(trifluoromethylsulphonyl)imide or bis(2,4,4-trimethylpentyl)phosphinate.

In particular, the ionic liquid is selected from the group consisting of 1-ethyl-3-methylimidazolium, trihexyltetradecylphosphonium or 1-methyl-1-propylpiperidinium as cation, and chloride, hexafluorophosphate, bis(trifluoromethylsulphonyl)imide or bis(2,4,4-trimethylpentyl)phosphinate as anion.

Particularly preferred ionic liquids are commercial products which can be obtained e.g. from BASF SE, Ludwigshafen or from Iolitec, Heilbronn.

The possibly additional metal salt is preferably selected from the group consisting of alkali metal salts, alkaline earth metal salts and also transition metal salts, preferably alkali halogenides or -pseudohalogenides, alkaline earth metal halogenides or -pseudohalogenides and also transition metal halogenides or -pseudohalogenides, in particular lithium chloride, lithium bromide, lithium benzoate, magnesium chloride, calcium chloride and/or zinc chloride.

With respect to the mixing ratio of the totality of the azine dye to the at least one ionic liquid, weight ratios of 1:99 to 99:1, preferably of 10:90 to 90:10, further preferably of 80:20 to 20:80, are preferred. In the case where, in addition to the at least one azine dye, one or more of the above-mentioned metal salts are present, the above-indicated weight ratio comprises the sum of all the azine dyes and metal salts, relative to the ionic liquid.

Preferred crystallisable, thermoplastic polymers of the polymer matrix are thereby selected from the group consisting of
  a) polyamides, such as e.g. polyamide-6, 6.6, 6.10, 4.6, 4.10, 6.12, 12.12, polyamide 11, polyamide 12 and also (partially)aromatic polyamides, such as e.g. polyphthalamides, e.g. produced from terephthalic acid and/or isophthalic acid and aliphatic diamines or from aliphatic dicarboxylic acids, such as e.g. adipic acid or sebacic acid and aromatic diamines, such as e.g. 1,4- or 1,3-diaminobenzene, and also blends of various polyamides, in particular of PA-6 and PA-6.6,
  b) polymers made of olefins or diolefins, such as e.g. polyethylene (LDPE, LLDPE, VLDPE, ULDPE, MDPE, HDPE, UHMWPE), metallocene-PE (m-PE), polypropylene,
  c) polyacetals, such as e.g. polyoxymethylene (POM) or copolymers with e.g. butanal,
  d) polyphenylene oxides and blends with polystyrene or polyamides,
  e) polyimides, polyamideimides, polyetherimides, polyesterimides, poly(ether)ketones, polyarylsulphones, polyphenylensulphide, polybenzimidazoles, polyhydantoins,
  f) polyesters made of aliphatic or aromatic dicarboxylic acids or diols or made of hydroxycarboxylic acids, such as e.g. polyethylene terephthalate (PET), polybutylene terephthalate (PBT), polypropylene terephthalate (PPT), polyethylene naphthylate, poly-1,4-dimethylolcyclohexane terephthalate, polyhydroxybenzoate, polyhydroxynaphthylate, polylactic acid (PLA), polyhydroxybutyrate (PHB), polyhydroxyvalerate (PHV),
  g) and also mixtures, combinations or blends of two or more of the previously mentioned polymers or also of combinations or blends of the (partially)crystalline polymers with amorphous polymers, e.g. based on polystyrenes, halogen-containing polymers, such as PVC, polyurethanes or polycarbonates.

Provided the above-mentioned polymers concern copolymers, these can be present in the form of statistical ("random") block or "tapered" structures or as stereoblock copolymers.

Provided stereoregular polymers are concerned, these can be present in the form of isotactic, stereotactic but also atactic forms.

Possibly, the mentioned (partially)crystalline polymers can also be present crosslinked. Crosslinking can thereby be effected e.g. by addition of radical formers or by irradiation, such as electron beams, beta- or gamma rays, during processing or in a subsequent step.

The mentioned polymers a) to f) can thereby be present not only as virgin material but also in the form of recyclates, e.g. as production waste or material collections ("post-consumer" recyclates).

The polymer matrix thereby consists preferably of the previously mentioned polymers, i.e. the total composition, apart from the previously mentioned polymers, comprises no further polymers.

According to a particularly preferred embodiment, the polymer matrix consists of a polymer, selected from the group consisting of polyamides and polyesters, in particular polyamide 6, polyamide 66, polyethylene terephthalate, polybutylene terephthalate and polylactic acid. In particular polyamides, very particularly preferably polyamide 6 or polyamide 66, and also blends of polyamide 6 and polyamide 6.6 are hereby preferred.

In addition, it is preferred that the polymer composition comprises
  a) 99.98 to 70.00 parts by weight, preferably 99.97 to 80 parts by weight, particularly preferably 99.94 to 91 parts by weight, of a matrix made of at least one crystallisable, thermoplastic polymer,
  b) 0.01 to 10 parts by weight, particularly preferably 0.01 to 7.5 parts by weight, and particularly preferably 0.02 to 3 parts by weight, of at least one azine dye,
  c) 0.01 to 10 parts by weight, preferably 0.01 to 7.5 parts by weight, particularly preferably 0.02 to 3 parts by weight, of at least one ionic liquid, and also
  d) and optionally 0 to 10 parts by weight, preferably 0.01 to 5 parts by weight, particularly preferably 0.02 to 3 parts by weight, of at least one mono-, bi-, tri- and/or tetravalent metal salt, the parts by weight of components a) to d) adding up to 100 parts by weight.

Particularly preferred is a polymer composition comprising or consisting of
  a) 99.98 to 70 parts by weight, preferably 99.97 to 80 parts by weight, particularly preferably 99.94 to 91 parts by weight, of a matrix made of at least one polyamide or polyester,
  b) 0.01 to 10 parts by weight, preferably 0.01 to 7.5 parts by weight, particularly preferably 0.02 to 3 parts by weight, of at least one nigrosine, c) 0.01 to 10 parts by weight, preferably 0.01 to 7.5 parts by weight, particularly preferably 0.02 to 3 parts by weight, of at least one ionic liquid, and also possibly d) 0 to 10 parts by weight, preferably 0.01 to 5% by weight, particularly preferably 0.02 to 3 parts by weight, of at least one alkali- or alkaline earth halogenide or -pseudohalogenide, the parts by weight of components a) to d) adding up to 100 parts by weight.

In addition, the composition can comprise further additives, in particular selected from the group consisting of UV absorbers, light stabilisers, stabilisers, hydroxylamines, benzofuranones, metal deactivators, filler deactivators, flame retardants, nucleation agents, impact strength enhancers, plasticisers, lubricants, rheology modifiers, processing aids, mould-release agents, pigments, colourants, fillers, reinforcing materials, optical brighteners, antimicrobial active substances, antistatic agents, slip agents, antiblocking agents, coupling means, chain extenders, dispersants, compatibilisers, oxygen collectors, acid collectors, marking means, anti-fogging means and also mixtures and combinations of at least two of the previously mentioned additives.

In a preferred embodiment, the compositions comprise in particular acid collectors, e.g. based on salts of long-chain acids, such as e.g. calcium stearate, magnesium stearate, zinc stearate, calcium lactate or on hydrotalcites and/or stabilisers from the group of phenolic antioxidants and phosphites and/or light stabilisers from the group of hindered amines (HALS) and/or dispersants and/or flame retardants and/or fillers/reinforcing materials and/or chain extenders.

Suitable light stabilisers are for example compounds based on 2-(2'-hydroxyphenyl)benzotriazoles, 2-hydroxybenzophenones, esters of benzoic acids, acrylates, oxamides and 2-(2-hydroxyphenyl)-1,3,5-triazines.

Preferred phenolic antioxidants are for example: octadecyl-3-(3,5-di-tert-butyl-4-hydroxyphenyl)propionate, pentaerythritoltetrakis[3-(3,5-di-tert-butyl-4-hydroxyphenyl) propionate, tris(3,5-di-tert-butyl-4-hydroxyphenyl)isocyanurate, 1,3,5-trimethyl-2,4,6-tris(3,5-di-tert-butyl-4-hydroxyphenyl)isocyanurate, 1,3,5-trimethyl-2,4,6-tris(3,5-di-tert-butyl-4-hydroxybenzyl)benzene, triethylene glycol-bis [3-(3-tert-butyl-4-hydroxy-5-methylphenyl)propionate, N,N'-hexan-1,6-diyl-bis[3-(3,5-di-tert-butyl-4-hydroxyphenyl)propionic acid amide.

Suitable phosphites/phosphonites are for example: triphenylphosphite, diphenylalkylphosphites, phenyldialkylphosphites, tri(nonylphenyl)phosphite, trilaurylphosphites, trioctadecylphosphite, distearylpentaerythritol diphosphite, tris-(2,4-di-tert-butylphenyl)phosphite, diisodecylpentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetratert-butyl-12H-dibenzo[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyldibenzo[d,g]-1,3,2-dioxaphosphocine, 2,2'2''-nitrilo[triethyltris(3,3'',5,5'-tetratert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Further suitable stabilisers are aminic antioxidants, such as e.g.
N,N'-diisopropyl-p-phenylenediamine, N, N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N, N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulphamoyl)diphenylamine, N,N'-dimethyl-N, N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino) propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene and also mixtures or combinations hereof.

Further suitable aminic antioxidants are hydroxylamines or N-oxides (nitrons), such as e.g. N,N-dialkylhydroxylamines, N,N-dibenzylhydroxylamine, N,N-dilaurylhydroxylamine, N,N-distearylhydroxylamine, N-benzyl-α-phenylnitron, N-octadecyl-α-hexadecylnitron, and also Genox EP (Addivant) according to the formula.

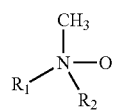

R₁, R₂ = C₁₄-C₂₄ alkyl

Genox EP

Further suitable stabilisers are thiosynergists. Suitable thiosynergists are, for example, distearylthiodipropionate, dilauryldipropionate or the compound according to the following formula:

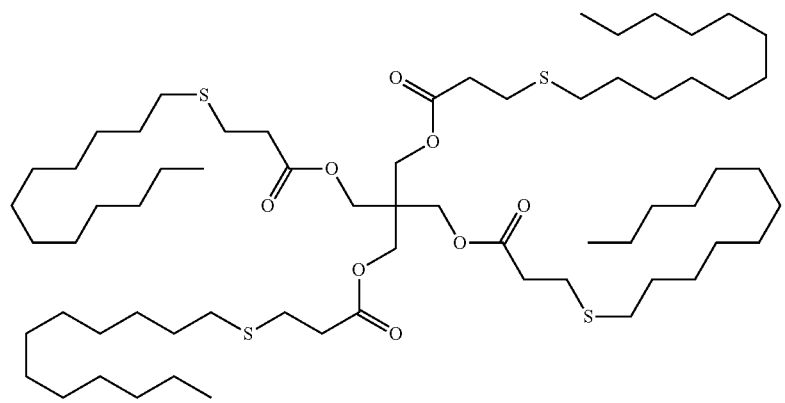 [SMILES: CCCCCCCCCCCCSCCC(=O)OCC(COC(=O)CCSCCCCCCCCCCCC)(COC(=O)CCSCCCCCCCCCCCC)COC(=O)CCSCCCCCCCCCCCC]

Further suitable stabilisers, in particular for polyamides, are copper salts, such as e.g. copper(I) iodide, copper(I) bromide or copper complexes, such as e.g. triphenylphosphine-copper(I) complexes.

Suitable hindered amines are for example 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro-[4,5]decane and epichlorohydrin.

Suitable dispersants are for example:
polyacrylates, e.g. copolymers with long-chain side groups, polyacrylate block copolymers, alkylamides: e.g. N,N'-1,2-ethandiylbisoctadecaneamide sorbitan ester, e.g. monostearyl sorbitan ester, titanates and zirconates, reactive copolymers with functional groups, e.g. polypropylene-co-acrylic acid, polypropylene-co-maleic anhydride, polyethylene-co-glycidylmethacrylate, polystyrene-alt-maleic anhydride-polysiloxanes: e.g. dimethylsilanediol-ethylene oxide copolymer, polyphenylsiloxane copolymer, amphiphilic copolymers: e.g. polyethylene-block-polyethylene oxide, dendrimers, e.g. hydroxyl group-containing dendrimers.

Suitable flame retardants are for example:
a) inorganic flame retardants, such as e.g. Al(OH)$_3$, Mg(OH)$_2$, AlO(OH), MgCO$_3$, layer silicates, such as e.g. montmorillonite or sepiolite, non- or organically modified double salts, such as e.g. Mg—Al silicates, POSS (Polyhedral Oligomeric Silsesquioxane) compounds, huntite, hydromagnesite or halloysite and also Sb$_2$O$_3$, Sb$_2$O$_5$, MoO$_3$, zinc stannate, zinc hydroxystannate, b) nitrogen-containing flame retardants, such as e.g. melamine, melem, melam, melon, melamine derivatives, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine-metal phosphates, such as e.g. melamine aluminium phosphate, melamine zinc phosphate, melamine magnesium phosphate, and also the corresponding pyrophosphates and polyphosphates, poly-[2,4-(piperazin-1,4,-yl]-6-(morpholin-4-yl)1,3,5-triazine], ammonium polyphosphate, melamine borate, melamine hydrobromide, c) radical formers, such as e.g. alkoxyamines, hydroxylamine esters, azo compounds, dicumyl or polycumyl, hydroxyimides and the derivatives thereof, such as e.g. hydroxyimide ester or hydroxyimide ether, d) phosphorus-containing flame retardants, such as e.g. red phosphorus, phosphates such as e.g. resorcin diphosphate, bisphenol-A-diphosphate and the oligomers thereof, triphenylphosphate, ethylenediamine phosphate, phosphinates, such as e.g. salts of hypophosphorous acid and the derivatives thereof, such as alkyl phosphinate salts, e.g. diethylphosphinate aluminium or diethylphosphinate zinc or aluminium phosphinate, aluminium phosphite, aluminium phosphonate, phosphonate esters, oligomeric and polymeric derivatives of methanephosphonic acid, 9,10-dihydro-9-oxa-10-phosphorylphenanthrene-10-oxide (DOPO) and the substituted compounds thereof, e) halogen-containing flame retardants based on chlorine and bromine, such as e.g. polybrominated diphenyl oxides, such as e.g. decabromodiphenyl oxide, tris(3-bromo-2,2-bis(bromomethyl) propylphosphate, tris(tribromoneopentyl)phosphate, tetrabromophthalic acid, 1,2-bis(tribromophenoxy)ethane, hexabromocyclododecane, brominated diphenylethane, tris-(2,3,-dibromopropyl)isocyanurate, ethylene-bis(tetrabromophthalimide), tetrabromobisphenol-A, brominated polystyrene, brominated polybutadiene or polystyrene-brominated polybutadiene copolymers, brominated polyphenylene ethers, brominated epoxy resin, polypentabromobenzylacrylate, possibly in combination with Sb$_2$O$_3$ and/or Sb$_2$O$_5$, f) borates, such as e.g. zinc borate or calcium borate, possibly on a carrier material, such as e.g. silica, g) sulphur-containing compounds, such as e.g. elementary sulphur, disulphides and polysulphides, thiuram sulphide, dithiocarbamates, mercaptobenzothiazole and sulphenamides,
h) anti-drip agents, such as e.g. polytetrafluoroethylene,
i) silicon-containing compounds, such as e.g. polyphenylsiloxanes,
j) carbon modifications, such as e.g. carbon nanotubes (CNT) or graphene and also combinations or mixtures hereof.

Suitable metal deactivators are for example N,N'-diphenyloxamide, N-salicylal-M-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazene, bis(benzylidene)oxalyldihydrazide, oxanilide, isophthaloyldihydrazide, sebacoylbisphenylhydrazide, N,N'-diacetyladipoyldihydrazide, N,N'-bis(salicyloyl)oxylyldihydrazide, N,N'-bis(salicyloyl)thiopropionyldihydraZide.

Suitable chain extenders for the linear molecular weight increase of polycondensation polymers such as polyesters or polyamides are for example diepoxides, bis-oxazolines, bizoxazolones, bis-oxazines, diiosocyanates, dianhydrides, bis-acyllactams, bis-maleimides, dicyanates, carbodiimides. Further suitable chain extenders are polymeric compounds, such as e.g. polystyrene-polyacrylate-polyglycidyl(meth)acrylate copolymers, polystyrene-maleic anhydride copolymers and polyethylene-maleic anhydride copolymers.

Suitable pigments can be of an inorganic or organic nature. Suitable inorganic pigments are for example titanium dioxide, zinc oxide, zinc sulphide, iron oxide, ultramarine, carbon black. Suitable organic pigments are for example anthraquinones, anthanthrones, benzimidazolones, quinacridones, diketopyrrolopyrroles, dioxazines, indanthrones, isoindolinones, azo-compounds, perylenes, phthalocyanines or pyranthrones. Further suitable pigments are effect pigments based on metal or pearlescent pigments based on metal oxide.

Optical brighteners are for example bisbenzoxazoles, phenylcumarines or bis(styryl) biphenyls.

Suitable filler deactivators are for example epoxides, such as e.g. bis-phenol-A-diglycidylether, polysiloxanes, polyacrylates, in particular block copolymers, such as polymethacrylic acid-polyalkylene oxide or polystyrene-polyacrylate-polyglycidyl(meth)acrylate copolymers.

Suitable antistatic agents are for example ethoxylated alkylamines, fatty acids, alkylsulphonates and polymers, such as e.g. polytheramides or copolymers, which comprise salts of acrylic acid, such as e.g. polyethylene-polyacrylate-polyacrylate-Na copolymers.

Suitable fillers and reinforcing materials are for example synthetic or natural materials, such as e.g. calcium carbonate, silicates, glass fibres, glass balls (solid or hollow), talc, mica, kaolin, barium sulphate, metal oxides and metal hydroxides, carbon black, graphite, carbon nanotubes, graphene, sawdust or fibres of natural products, such as e.g. cellulose, or synthetic fibres, and also metal fibres. Further suitable fillers are hydrotalcites or zeolites or layer silicates such as e.g. montmorillonite, bentonite, beidelite, mica, hectorite, saponite, vermiculite, ledikite, magadite, illite, kaolinite, wollastonite, attapulgite, sepiolite.

Suitable mould-release agents are for example montan wax.

This polymer composition according to the invention is suitable in particular for further processing to form special moulded parts, such as e.g. injection moulded parts, foils or films, foams, fibres, cables and pipes, profiles, hollow bodies, strips, membranes, such as e.g. geomembranes, which are produced via extrusion, injection moulding, blow-moulding, calendering, pressing processes, spinning processes, rotomoulding or painting and coating processes, e.g. for the electrical and electronics industry, construction industry, transport industry (car, aircraft, ship, rail), for medical applications, for household- and electrical appliances, vehicle parts, consumer articles, packagings, furniture, textiles. These moulded parts are also part of the present invention.

A further preferred application of the compositions according to the invention are polymer materials which are used for generative manufacture ("additive manufacturing") processes, such as e.g. laser sintering or 3D printing.

A further preferred application of the compositions according to the invention are polymer materials which are suitable for plastic material welding, e.g. laser welding.

The present invention relates in addition to an additive composition for crystallisation delay and/or for lowering the crystallisation point of crystallisable, thermoplastic polymers or polymer compositions, consisting of or comprising
a) at least one azine dye and also
b) at least one ionic liquid.

Surprisingly, it could be established that this additive composition is able to influence the crystallisation behaviour of crystallisable, thermoplastic polymers or polymer compositions such that the addition of an additive composition according to the invention leads to crystallisation delay and/or to lowering of the crystallisation point of the thermoplastic polymer. Furthermore, by means of this addition or the consequently initiated crystallisation behaviour, further properties of the plastic material are influenced, such as e.g. the surface property, surface quality, fewer visible flow lines, gloss, reduced shrinkage during production, improved mechanical properties, electrical properties, rheological properties, improved ageing behaviour, thermal stability. Furthermore, an increased amorphous proportion in the partially crystalline plastic material can be achieved.

Preferred representatives of the azine dyes, metal salts and ionic liquids have already been described above.

The weight ratio of the totality of the at least one azine dye to the at least one ionic liquid is of 1:99 to 99:1, preferably of 10:90 to 90:10, further preferably of 80:20 to 20:80.

The present invention likewise relates to methods for crystallisation delay and/or for lowering the crystallisation point of a crystallisable thermoplastic polymer, in which a previously described additive composition according to the invention is added into a polymer matrix, comprising or consisting of at least one crystallisable, thermoplastic polymer, the polymer matrix is transferred into the melt and subsequently cooled. As an alternative hereto, it is likewise possible that the previously mentioned additive composition is incorporated into a polymer matrix in the molten state, comprising or consisting of at least one crystallisable, thermoplastic polymer and subsequently is cooled.

In the case where further components are added to the polymer composition, these can be added to the polymers separately, in the form of liquids, powders, granulates or compacted products or together with the additive composition according to the invention, as described previously.

Incorporation of the above-described additive composition and possibly the additional additives into the plastic material is effected by normal processing methods, the polymer being melted and mixed with the additive composition according to the invention and with the possibly further additives, preferably by mixers, kneaders and extruders. As processing machines, there are preferred extruders, such as e.g. single-screw extruders, twin-screw extruders, planetary gear extruders, ring extruders, co-kneaders, which are fitted preferably with vacuum degassing. The processing can thereby be effected under air or possibly under inert gas conditions.

Furthermore, the additive compositions according to the invention can be produced and introduced in the form of so-called master batches or concentrates which comprise for example 10-90% of the compositions according to the invention in one polymer.

In addition, the present invention relates to the use of an additive composition according to the invention for crystallisation delay and/or for reducing the crystallisation speed and/or for lowering the crystallisation point of crystallisable, thermoplastic polymers.

The present invention is described in more detail with reference to the subsequent embodiments, without however restricting the invention to the represented preferred parameters.

Embodiments: Production and Testing of Polyamide Moulding Compounds with a Reduced Crystallisation Temperature A polyamide 6 (Alphaion 27, Grupa Azoty ATT Polymers GmbH) was mixed with 1-ethyl-3-methylimidazolium chloride (Iolite 0093, IOLITEC Heilbronn) and/or nigrosine in the melt. The compositions are described in table 1. The processing in the melt was implemented with a synchronised twin-screw extruder (Thermo Scientific Process 11). The speed of rotation of the screws was 450 min-1, with a throughput of 800 gh-1 and a melt temperature of 260° C. The hot melt was then cooled in a water bath and subsequently strand-granulated.

Thermal analysis of the compounds was implemented by means of dynamic differential scanning calorimetry (DSC). For testing the melting and crystallisation behaviour, a DSC 822e (Mettler-Toledo AG) with a constant nitrogen throughflow of 20 ml min-1 and nitrogen cooling was used. The temperature and the heat flow were calibrated with indium and zinc. The sample quantity was always 5 mg with a deviation of ±0.1 mg. An aluminium crucible was used. The samples were heated at 10° C. $\text{min}^{-1}$ from 0° C. to 270° C. and kept there for 3 min. Thereafter, the sample was cooled again at 10° C. $\text{min}^{-1}$ to 0° C. This cycle was repeated twice. Analysis of the characteristic values, melting temperature Ts, peak crystallisation temperature $T_{PC}$ and crystallisation enthalpy ΔHc ($\text{Jg}^{-1}$) was undertaken with the second heating and cooling cycle. The characteristic value $T_{PC}$, which is relevant to the invention, is displayed in Table 1 for all the examples.

TABLE 1

| Example | Additive(s) | % by weight | $T_{PC}$ [° C.] |
|---|---|---|---|
| Comparative example 1 | Nigrosine | 0.5 | 181.2 |
| Comparative example 2 | Nigrosine | 3.0 | 180.4 |
| Comparative example 3 | 1-ethyl-3-methylimidazolium chloride | 0.5 | 184.6 |
| Comparative example 4 | 1-ethyl-3-methylimidazolium chloride | 1.5 | 182.9 |
| Comparative example 5 | 1-ethyl-3-methylimidazolium chloride | 3.0 | 181.8 |
| Comparative example 6 | 1-butyl-3-methylimidazolium hexafluorophosphate | 1.5 | 182.9 |
| Comparative example 7 | 1-butyl-3-methylimidazolium hexafluorophosphate | 3.0 | 180.0 |
| Example 1 according to the invention | Nigrosine/1-ethyl-3-methylimidazolium chloride 1:1 | 0.5 | 180.1 |
| Example 2 according to the invention | Nigrosine/1-ethyl-3-methylimidazolium chloride 1:1 | 1.5 | 178.3 |
| Example 3 according to the invention | Nigrosine/1-ethyl-3-methylimidazolium chloride 1:1 | 3.0 | 175.8 |
| Example 4 according to the invention | Nigrosine/1-ethyl-3-methylimidazolium chloride 1:2 | 3.0 | 180.2 |
| Example 5 according to the invention | Nigrosine/1-ethyl-3-methylimidazolium chloride 2:1 | 3.0 | 173.7 |
| Example 6 according to the invention | Nigrosine/1-butyl-3-methylimidazolium hexafluorophosphate 1:1 | 3.0 | 176.4 |

For the above mentioned examples, the following products were used:

Nigrosine: NIGROSINBASE BA01 (LANXESS Deutschland GmbH) 1-ethyl-3-methylimidazolium chloride: Iolite 0093 (IOLITEC, Heilbronn) 1-butyl-3-methylimidazolium hexafluorophosphate: 1-butyl-3-methylimidazolium hexafluorophosphate (TCI Europe N.V.)

The examples according to the invention show surprisingly, at the same concentrations, a significantly lowered crystallisation temperature in comparison to the comparative examples which comprise only one of the two components of the examples according to the invention.

The invention claimed is:

1. A polymer composition comprising:
   a) a matrix made of at least one crystallisable, thermoplastic polymer,
   b) at least one azine dye, and
   c) at least one ionic liquid;
   wherein the at least one ionic liquid is selected from the group consisting of compounds made of an organic cation and an organic or inorganic anion with a melting point at normal pressure of less than 150° C.,
   wherein the organic cation is selected from the group consisting of methyltri(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl) imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3- dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium, ethyltributylphosphonium, tetrabutylphosphonium, tetraoctylphosphonium, tributylmethylphosphonium, tributyltetradecylphosphonium, trihexyltetradecylphosphonium, 1-butyl-1-methylpiperidinium, and 1-methyl-1-propylpiperidinium, and wherein the organic or inorganic anion is selected from the group consisting of chloride, bromide, hydrogen sulphate, tetrachloroaluminate, thiocyanate, methylsulphate, ethylsulphate, methane sulphonate, formate, acetate, dimethylphosphate, diethylphosphate, p-toluene sulphonate, tetrafluoroborate, hexafluorophosphate, bis(trifluoromethylsulphonyl)imide, and bis(2,4,4-trimethylpentyl)phosphonate.

2. The polymer composition according to claim 1, wherein the at least one azine dye is selected from the group consisting of phenazine dyes, oxazine dyes, thiazine dyes, and bisazine dyes.

3. The polymer composition according to claim 1, wherein the ionic liquid is composed of a cation selected from the group consisting of 1-ethyl-3-methylimidazolium, trihexyltetradecylphosphonium and 1-methyl-1-propylpiperidinium, and an anion selected from the group consisting of chloride, hexafluorophosphate, bis(trifluoromethylsulphonyl)imide and bis(2,4,4-trimethylpentyl)phosphinate.

4. The polymer composition according to claim 1, wherein, in addition, at least one mono-, bi-, tri- and/or tetravalent metal salt, selected from the group consisting of alkali metal salts, alkaline earth metal salts and transition metal salts, is contained in the polymer composition.

5. The polymer composition according to claim 4, wherein the at least one mono-, bi-, tri- and/or tetravalent metal salt is selected from the group consisting of alkali metal halogenides or -pseudohalogenides, alkaline earth metal halogenides or -pseudohalogenides and transition metal halogenides or -pseudohalogenides.

6. The polymer composition according to claim 1, wherein the weight ratio of the totality of the at least one azine dye and of the at least one mono-, bi-, tri- and/or tetravalent metal salt to the at least one ionic liquid is of 1:99 to 99:1.

7. The polymer composition according to claim 6, wherein the at least one crystallisable, thermoplastic polymer of the polymer matrix is selected from the group consisting of
a) polyamides,
b) polymers made of olefins or diolefins,
c) polyacetals,
d) polyphenylene oxides and blends with polystyrene or polyamides,
e) polyimides, polyamideimides, polyetherimides, polyesterimides, poly(ether)ketones, polyarylsulphones, polyphenylensulphide, polybenzimidazoles, polyhydantoins,
f) polyesters made of aliphatic or aromatic dicarboxylic acids or diols or made of hydroxycarboxylic acids, and
g) mixtures, combinations or blends of two or more of the polymers in a) to f).

8. The polymer composition according to claim 6, wherein the polymer matrix consists of a polymer selected from the group consisting of polyamides and polyesters.

9. The polymer composition according to claim 1, comprising
a) 99.98 to 70 parts by weight of a matrix made of at least one crystallisable, thermoplastic polymer,
b) 0.01 to 10 parts by weight of at least one azine dye,
c) 0.01 to 10 parts by weight of the at least one ionic liquid, and
d) 0 to 10 parts by weight of at least one mono-, bi-, tri- and/or tetravalent metal salt,
the parts by weight of components a) to d) adding up to 100 parts by weight.

10. The polymer composition according to claim 1, comprising
a) 99.98 to 70 parts by weight of a matrix made of at least one polyamide or polyester,
b) 0.01 to 10 parts by weight of at least one nigrosine,
c) 0.01 to 10 parts by weight of the at least one ionic liquid, and
d) 0 to 10 parts by weight of at least one alkali- or alkaline earth halogenide or -pseudohalogenide,
the parts by weight of components a) to d) adding up to 100 parts by weight.

11. The polymer composition according to claim 1, further comprising, in addition to components a) to c), at least one additive selected from the group consisting of UV absorbers, light stabilisers, stabilisers, hydroxylamines, benzofuranones, metal deactivators, filler deactivators, nucleation agents, impact strength enhancers, flame retardants, plasticisers, lubricants, rheology modifiers, processing aids, mould-release agents, pigments, colourants, optical brighteners, antimicrobial active substances, antistatic agents, slip agents, antiblocking agents, coupling means, chain extenders, dispersants, compatibilisers, oxygen collectors, acid collectors, marking means, anti-fogging means, fillers/reinforcing materials, chain extenders, and mixtures and combinations of at least two of the previously mentioned additives.

12. An additive composition for crystallisation delay and/or for lowering the crystallisation point of crystallisable, thermoplastic polymers or polymer compositions comprising
a) at least one azine dye and
b) at least one ionic liquid;
wherein the at least one ionic liquid is selected from the group consisting of compounds made of an organic cation and an organic or inorganic anion with a melting point at normal pressure of less than 150° C.,
wherein the organic cation is selected from the group consisting of methyltri(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium, ethyltributylphosphonium, tetrabutylphosphonium, tetraoctylphosphonium, tributylmethylphosphonium, tributyltetradecylphosphonium, trihexyltetradecylphosphonium, 1-butyl-1-methylpiperidinium, and 1-methyl-1-propylpiperidinium, and wherein the organic or inorganic anion is selected from the group consisting of chloride, bromide, hydrogen sulphate, tetrachloroaluminate, thiocyanate, methylsulphate, ethylsulphate, methane sulphonate, formate, acetate, dimethylphosphate, diethylphosphate, p-toluene sulphonate, tetrafluoroborate, hexafluorophosphate, bis(trifluoromethylsulphonyl)imide, and bis(2,4,4-trimethylpentyl)phosphonate.

13. The additive composition according to claim 12, wherein the at least one azine dye is selected from the group consisting of phenazine dyes, oxazine dyes, thiazine dyes and/or bisazine dyes.

14. The additive composition according to claim 12, wherein, in addition, at least one mono-, bi-, tri- and/or tetravalent metal salt, selected from the group consisting of alkali metal salts, alkaline earth metal salts and transition metal salts, is contained in the additive composition.

15. The additive composition according to claim 12, wherein the weight ratio of the totality of the at least one azine dye and/or of the at least one mono-, bi-, tri- or tetravalent metal salt to the at least one ionic liquid is of 1:99 to 99:1.

16. A method for crystallisation delay and/or for lowering the crystallisation point of a crystallisable, thermoplastic polymer, in which an additive composition according to claim 12 is added into a polymer matrix comprising at least one crystallisable, thermoplastic polymer,
the polymer matrix is transferred into the melt and subsequently cooled,
or the additive composition is incorporated into a polymer matrix in the molten state, comprising at least one crystallisable, thermoplastic polymer, and subsequently cooled.

17. The method according to claim 16, wherein the additive composition is introduced in the form of a master batch or concentrate, the master batch comprising 40 to 90% by weight of the additive composition, dispersed in at least one thermoplastic polymer.

18. A method for crystallisation delay and/or for lowering the crystallisation point of crystallisable, thermoplastic polymers comprising utilizing the additive composition according to claim 12.

* * * * *